United States Patent
Pan et al.

(10) Patent No.: US 9,582,726 B2
(45) Date of Patent: Feb. 28, 2017

(54) SYSTEMS AND METHODS FOR IMAGE PROCESSING IN A DEEP CONVOLUTION NETWORK

(71) Applicant: QUALCOMM Incorporated, San Diego, CA (US)

(72) Inventors: Yunke Pan, San Diego, CA (US); Dashan Gao, San Diego, CA (US); Xin Zhong, San Diego, CA (US); Shuxue Quan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/749,387

(22) Filed: Jun. 24, 2015

(65) Prior Publication Data

US 2016/0379073 A1    Dec. 29, 2016

(51) Int. Cl.
*G06K 9/00* (2006.01)
*G06T 5/20* (2006.01)
*G06T 11/60* (2006.01)

(52) U.S. Cl.
CPC ............ *G06K 9/00986* (2013.01); *G06T 5/20* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 5,155,406 A * | 10/1992 | Cho | H03H 9/02976 310/313 B |
| 5,535,288 A | 7/1996 | Chen et al. | |
| 6,504,971 B1 * | 1/2003 | Margalit | G02B 6/12002 385/24 |
| 6,768,843 B1 * | 7/2004 | Sidick | G02B 6/12007 385/24 |
| 7,400,781 B2 * | 7/2008 | Kyo | G06T 5/20 382/276 |
| 7,826,676 B2 | 11/2010 | Porikli | |
| 2001/0050814 A1 * | 12/2001 | Zhao | G02B 27/288 359/489.19 |
| 2002/0003643 A1 * | 1/2002 | Qian | G02B 6/12007 398/82 |
| 2002/0010728 A1 * | 1/2002 | Stoye | H03H 17/06 708/319 |
| 2004/0005012 A1 * | 1/2004 | Suzuki | H03M 13/253 375/262 |
| 2010/0106944 A1 * | 4/2010 | Symes | G06F 9/3887 712/208 |
| 2011/0029471 A1 | 2/2011 | Chakradhar et al. | |
| 2013/0144833 A1 * | 6/2013 | Ivanova | G06F 17/30592 707/600 |

(Continued)

FOREIGN PATENT DOCUMENTS

CN    102339386 B    8/2013
CN    104077233 A    10/2014

*Primary Examiner* — Michelle Hausmann
(74) *Attorney, Agent, or Firm* — Austin Rapp & Hardman

(57) ABSTRACT

A method performed by an electronic device is described. The method includes interleaving multiple input image channels to produce an interleaved multi-channel input. The method also includes loading the interleaved multi-channel input to a single-instruction multiple data (SIMD) processor. The method further includes convolving the interleaved multi-channel input with a multi-channel filter.

26 Claims, 9 Drawing Sheets

(56) References Cited

U.S. PATENT DOCUMENTS

| | | | |
|---|---|---|---|
| 2015/0178246 A1* | 6/2015 | Herrero Abellanas | G06K 9/627 708/300 |
| 2016/0180548 A1* | 6/2016 | Kamenetskaya ......... | G06T 7/40 345/582 |

* cited by examiner

SYSTEMS AND METHODS FOR IMAGE PROCESSING IN A DEEP CONVOLUTION NETWORK

FIELD OF DISCLOSURE

The present disclosure relates generally to electronic devices. More specifically, the present disclosure relates to systems and methods for image processing.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, personal cameras, action cameras, surveillance cameras, mounted cameras, smart phones, feature phones, computers, tablets, drones, televisions, etc.) capture and/or utilize images. For example, a smartphone may capture and/or process still and/or video images. Processing images may demand a relatively large amount of time, memory and energy resources. The resources demanded may vary in accordance with the complexity of the processing.

It may be difficult to implement some complex processing tasks. For example, some processing tasks may take a long time to complete and/or may yield undesirable results. This may be especially true in mobile platforms (e.g., mobile devices such as smartphones, tablets, laptop computers, etc.) that may have limited processing, memory and/or energy resources (e.g., limited battery life). As can be observed from this discussion, systems and methods that improve image processing may be beneficial.

SUMMARY

A method performed by an electronic device is described. The method includes interleaving a plurality of input image channels to produce an interleaved multi-channel input. The method also includes loading the interleaved multi-channel input to a single-instruction multiple data (SIMD) processor. The method further includes convolving the interleaved multi-channel input with a multi-channel filter. The method may include performing object recognition based on the convolution. The method may include, for each input element, loading the element only once for multiple output elements.

The method may include storing a maximum number of filter coefficients of a filter kernel in registers of the SIMD processor. The method may also include applying the maximum number of filter coefficients in convolution operations without reloading any of the maximum number of filter coefficients from a cache.

Convolving the interleaved multi-channel input with the multi-channel filter may include multiplying an image input in parallel with multiple filter coefficients and accumulating sums in parallel. The convolution may be Deep Convolution Network (DCN) convolution.

The method may include interleaving multiple filter channels to produce the multi-channel filter. The method may include storing a kernel of the multi-channel filter in registers.

The method may include storing the interleaved multi-channel input in a level 1 (L1) cache and/or a level 2 (L2) cache. The method may include storing an output in a level 1 (L1) cache.

An electronic device is also described. The electronic device includes a single-instruction multiple data (SIMD) processor configured to interleave a plurality of input image channels to produce an interleaved multi-channel input, to load the interleaved multi-channel input to the SIMD processor, and to convolve the interleaved multi-channel input with a multi-channel filter.

An apparatus is also described. The apparatus includes means for interleaving a plurality of input image channels to produce an interleaved multi-channel input. The apparatus also includes means for loading the interleaved multi-channel input to a single-instruction multiple data (SIMD) processor. The apparatus further includes means for convolving the interleaved multi-channel input with a multi-channel filter.

A computer-program product is also described. The computer-program product includes a non-transitory computer-readable medium with instructions. The instructions include code for causing an electronic device to interleave a plurality of input image channels to produce an interleaved multi-channel input. The instructions also include code for causing the electronic device to load the interleaved multi-channel input to a single-instruction multiple data (SIMD) processor. The instructions further include code for causing the electronic device to convolve the interleaved multi-channel input with a multi-channel filter.

DETAILED DESCRIPTION

The systems and methods disclosed herein may improve image processing. For example, some configurations of the systems and methods disclosed herein may implement interleaving and/or parallel processing in a Deep Convolution Network (DCN). A DCN is a type of Convolutional Neural Network. In some configurations, a DCN may be considered to mimic visual mechanisms of a living organism. In the human brain, for example, the visual cortex contains lots of cells. Each cell is responsible for detecting the light from a small overlapping sub-region. A cell may perform a filter-like operation to extract the visual features. A DCN may be utilized to extract features via convolution operations. The DCN may be utilized for image recognition. For example, to recognize faces in an image, a sub-image from a sliding window on the image may be fed to the DCN to detect whether there are faces in the sub-image. The speed of the DCN is a significant factor in image recognition time. Inside the DCN, convolution takes (e.g., convolution layers take) about 97% of the processing time. For example, it takes about 1,343 milliseconds (ms) with an input image size of 227×227 pixels in a conventional approach (in a plain C implementation, for instance). Out of the total time, convolution layers take 1,307 ms to process, which represents 97% of total processing time. Accordingly, there is a need for more efficient image processing (e.g., improved DCN convolution). The systems and methods disclosed herein may improve image processing efficiency. For example, DCN convolution may be improved by accelerating convolution (e.g., convolution processing inside the DCN). Some configurations of the systems and methods may provide one or more of image rearrangement, increased cache access efficiency and parallel processing, which may accelerate convolution. In the 227×227 scenario, for example, the systems and methods disclosed herein may improve DCN convolution by reducing convolution time from approximately 1300 ms to 180 ms.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
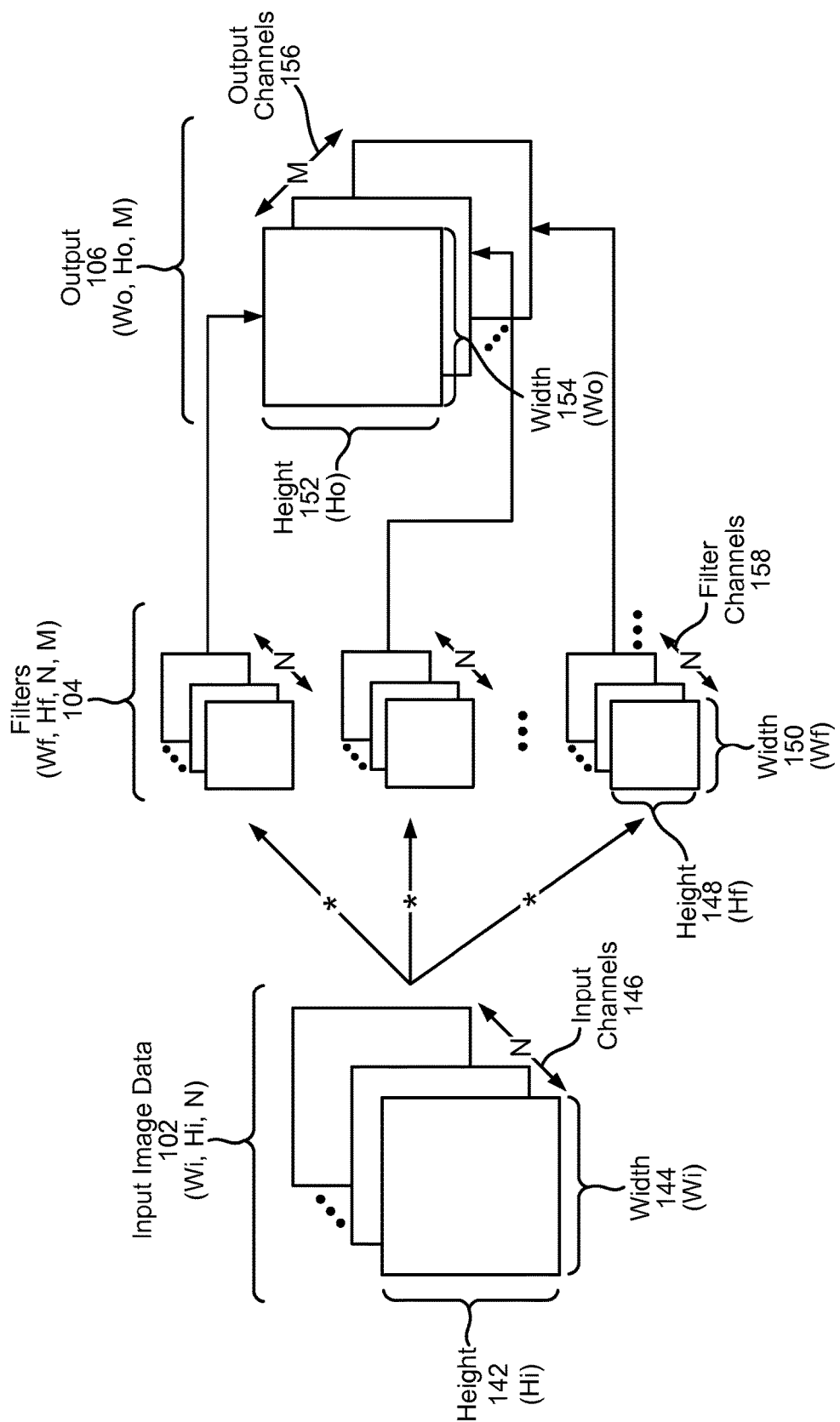
FIG. 1 is a diagram illustrating an example of Deep Convolution Network (DCN) convolution.

FIG. 1 is a diagram illustrating an example of Deep Convolution Network (DCN) convolution. In particular, FIG. 1 illustrates input image data 102, filters 104 and output 106. The input image data 102 may be digital image data. In this example, the input image data 102 is a 3-dimensional input. For example, the input image data 102 may have a height 142 (Hi), a width 144 (Wi) and input channels 146 (N). The height 142 may be in number of pixels and the width 144 may be in number of pixels. Each of the channels 146 may represent a component of the input image data 102. For example, each of the channels 146 may respectively be red, green and blue (RGB) components of the input image data 102. It should be noted that other channels 146 may be utilized. For example, each of the channels 146 may respectively be cyan, magenta, yellow and black (CMYK); red, green, blue and alpha (RGBA); or hue, saturation and brightness (HSV); etc.

The filters 104 may be 4-dimensional. For example, a number of filters (M) may be utilized, where each of the filters has 3 dimensions: height 148 (Hf), width 150 (Wf) and filter channels 158 (N). The input image data 102 may be multiplied by the filters 104 to produce an output 106. The output 106 may be 3-dimensional. For example, the output 106 may have a height 152 (Ho), a width 154 (Wo) and output channels 156 (M). The convolution of a DCN may be expressed as given in Equation (1).

$$Y[m, y, x] = \sum_{c=0}^{c<N} \sum_{i=0}^{i<Hf} \sum_{j=0}^{j<Wf} X[c, y-i, x-j] \cdot F[m, c, i, j] \quad (1)$$

In Equation (1), X is the input image data, F is the filter, Y is the convolution output, m is a (filter/output) channel index, y is a vertical (pixel) position, x is a horizontal (pixel) position, c is an input channel index, i is a height index and j is a width index.

Some difficulties in DCN convolution are given as follows. The filter may not be separable and may need to be performed as a two dimensional (2D) convolution. In some configurations, the filter kernel of each channel may be relatively small (e.g., 3×3), which makes it more difficult to apply single-instruction multiple data (SIMD) instructions. DCN convolution may tend to employ large data access and multiply and accumulate (MAC) operations. Table (1) shows an example of data access and MAC operations with a 5-layer DCN and a 227×227 input image. As can be observed in this example, there are approximately 5,238 megabytes of data to be read. Accordingly, improved cache operation may be beneficial to reduce convolution time. In this example, there are approximately 665 MAC operations. Accordingly, it may be beneficial to utilize a SIMD to do MAC operations in parallel.

TABLE 1

|         | Bytes Read    | Bytes Written | Total MACs  |
|---------|---------------|---------------|-------------|
| Layer 0 | 844,483,200   | 1,161,600     | 105,415,200 |
| Layer 1 | 1,792,336,896 | 746,496       | 223,948,800 |
| Layer 2 | 1,196,422,656 | 259,584       | 149,520,384 |
| Layer 3 | 897,381,888   | 259,584       | 112,140,288 |
| Layer 4 | 598,254,592   | 173,056       | 74,760,192  |
| Total   | 5,328,879,232 | 2,600,320     | 665,784,864 |

Figure 2:
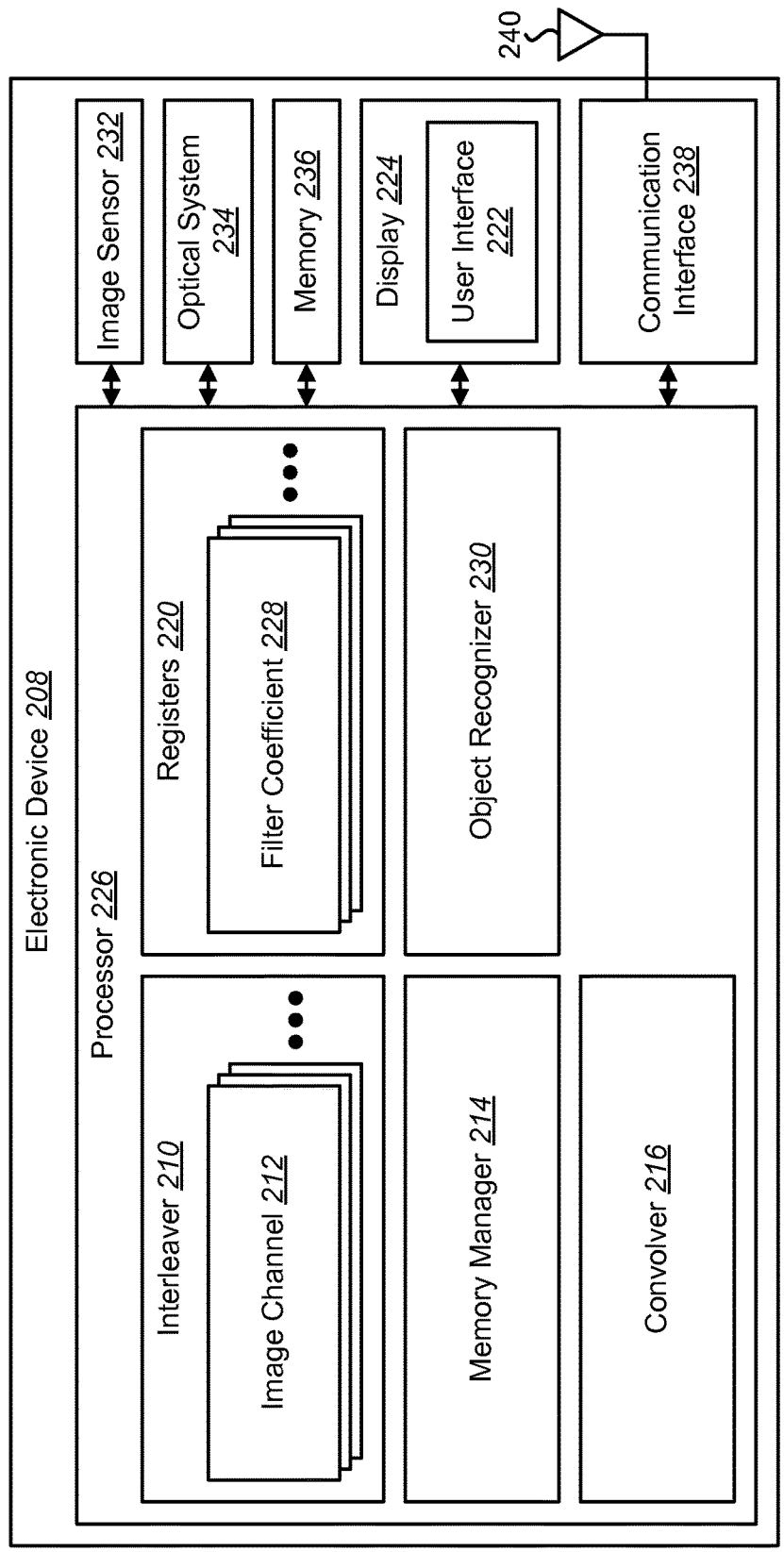
FIG. 2 is a block diagram illustrating one example of an electronic device in which systems and methods for image processing may be implemented.

FIG. 2 is a block diagram illustrating one example of an electronic device 208 in which systems and methods for image processing may be implemented. Examples of the electronic device 208 include smartphones, cellular phones, computers (e.g., desktop computers, laptop computers, etc.), tablet devices, media players, televisions, gaming consoles, personal digital assistants (PDAs), robots, wearable devices, aircraft, unmanned aerial vehicles (UAVs), automobiles, etc. The electronic device 208 may include one or more components or elements. One or more of the components or elements may be implemented in hardware (e.g., circuitry) or a combination of hardware and software (e.g., a processor with instructions). In some configurations, the electronic device 208 may include a processor 226, an image sensor 232, an optical system 234, a memory 236, a display 224 and/or a communication interface 238. The processor 226 may be coupled to (e.g., in electronic communication with) one or more of the image sensor 232, optical system 234, memory 236, display 224 and communication interface 238.

The processor 226 may execute instructions and/or manipulate data. Although only a single processor 226 is illustrated in FIG. 2, it should be noted that multiple processors may be implemented in some configurations. Additionally or alternatively, the processor 226 may be a multi-issue (e.g., dual-issue) processor in some configurations. Multi-issue processors may be capable of executing multiple instructions in parallel.

In some configurations, the processor 226 may be and/or may include a single instruction multiple data (SIMD)

processor. A SIMD processor may be capable of processing multiple data (in parallel) with a single instruction. For example, a SIMD processor may be capable of processing multiple data elements (e.g., 2 data elements, 4 data elements, 8 data elements, etc.) with a single instruction.

The communication interface 238 may enable the electronic device 208 to communicate with one or more other electronic devices. For example, the communication interface 238 may provide an interface for wired and/or wireless communications. In some configurations, the communication interface 238 may be coupled to one or more antennas 240 for transmitting and/or receiving radio frequency (RF) signals. The communication interface 238 may be optional (e.g., not included) in some configurations.

The electronic device 208 may obtain image input data (e.g., one or more digital images and/or a subset of one or more digital images). In some configurations, the electronic device 208 may receive the image input data from another device (e.g., an image sensor coupled to the electronic device 208, a networked device, a remote server, an external drive (e.g., flash drive, an external hard drive), a memory card, etc.). For example, the electronic device 208 may receive the image input data via the communication interface 238 using wired and/or wireless communications.

Additionally or alternatively, the electronic device 208 may capture the one or more images. For example, the electronic device 208 may include a camera. The camera may include the image sensor 232 and the optical system 234 (e.g., lenses) that focuses images of objects that are located within the field of view of the optical system 234 onto the image sensor 232. In some configurations, the electronic device 208 may include a camera software application and/or a display 224. When the camera application is running, images of objects that are located within the field of view of the optical system 234 may be recorded by the image sensor 232. The images that are being recorded by the image sensor 232 may be presented on the display 224. In some configurations, these images may be displayed in rapid succession at a relatively high frame rate so that, at any given moment in time, the objects that are located within the field of view of the optical system 234 are presented on the display 224. The one or more images obtained by the electronic device 208 may be one or more video frames and/or one or more still images.

In some configurations, the electronic device 208 may present a user interface 222 on the display 224. For example, the user interface 222 may enable a user to interact with the electronic device 208 (e.g., indicate and/or select one or more objects in an image). In some configurations, the display 224 may be a touchscreen that receives input from physical touch (by a finger, stylus or other tool, for example).

Additionally or alternatively, the electronic device 208 may include or be coupled to another input interface. For example, the electronic device 208 may include a camera facing a user and may detect user gestures (e.g., hand gestures, arm gestures, eye tracking, eyelid blink, etc.). In another example, the electronic device 208 may be coupled to a mouse and may detect a mouse click indicating a selected area (e.g., point) in an image. Accordingly, one or more selected objects may be indicated (e.g., selected) in any suitable way. For example, a touch input, a mouse click, a recognized gesture, facial recognition, object recognition, etc., may be used to indicate a selected object. In some configurations, the electronic device 208 may automatically detect one or more objects (e.g., faces, people, animals, cars, signs, text, etc.) in the one or more images.

The processor 226 may include and/or implement a memory manager 214. The memory manager 214 may access (e.g., read and/or write) data in the memory 236 and/or in the registers 220. For example, the memory manager 214 may read input image data (from the image sensor 232, memory 236 and/or the communication interface 238, for example) and store the input image data in the registers 220. In some configurations, the input image data may be based on one or more subsets of an image. For example, the input image data may include image data from one or more regions of interest (ROIs) in one or more images. Examples of ROIs include bounding regions and bounding boxes. As described in connection with FIG. 1, the input image data include multiple input channels of input image data. The processor 226 (e.g., memory manager 214) may read multiple input image channels of input image data from the memory 236.

The processor 226 may include and/or implement an interleaver 210. The interleaver 210 may interleave a plurality of input image channels 212 to produce an interleaved multi-channel input. For example, the interleaver 210 may arrange and/or order the plurality of input image channels in a sequence for loading into a SIMD processor. In some configurations, the input image values may be interleaved over channels. For example, assume values at (x, y, c), where x is a horizontal position in image data, y is vertical position in image data and c is a channel of image data. Assuming that 4 values can be processed in a SIMD processor, the values may be ordered as: (0, 0, 0); (0, 0, 1); (0, 0, 2); (0, 0, 3); (1, 0, 0); (1, 0, 1); (1, 0, 2); (1, 0, 3); (2, 0, 0); (2, 0, 1); (2, 0, 2); (2, 0, 3); etc. In some configurations of DCN convolution, some (e.g., most) layers may have a number of channels that is a multiple of 4. Arranging the input image channels 212 into the interleaved multi-channel input (in memory 236, for example) may advantageously enable application of SIMD instructions to perform multiple-channel convolution simultaneously. In an interleaved data format, for example, multiple channels may be in the same page in memory 236, which may be more efficient for memory access.

Figure 5:
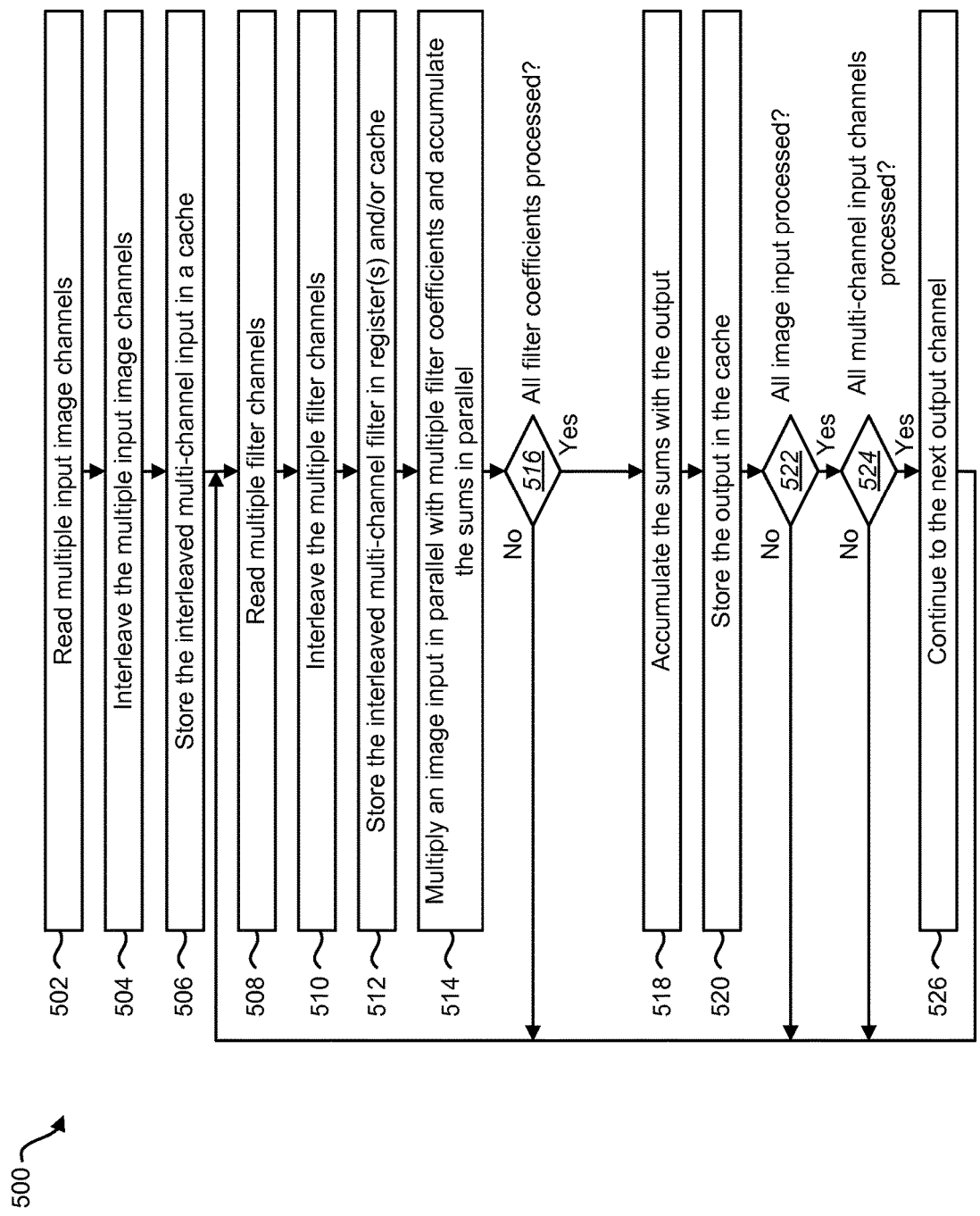
FIG. 5 is a flow diagram illustrating one example of a configuration of a method for implementing DCN convolution in accordance with the systems and methods disclosed herein.
Figure 6:
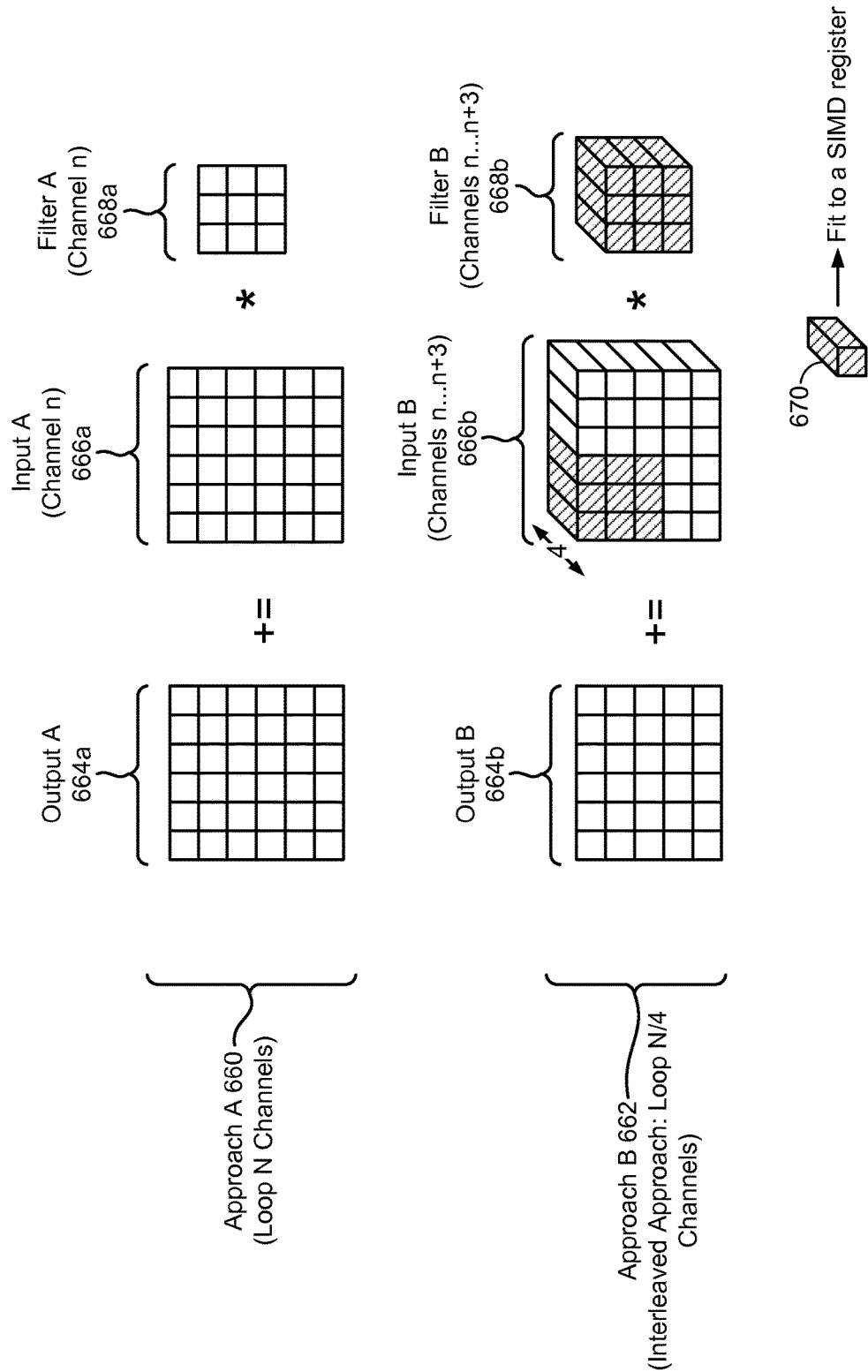
FIG. 6 is a diagram illustrating examples of Approach A and Approach B for processing image data.

Examples of interleaving are given in connection with FIGS. 5 and 6. The processor 226 (e.g., memory manager 214) may store the interleaved multi-channel input in the memory 236 (e.g., in a level 1 (L1) cache). During processing, the memory manager 214 may load the interleaved multi-channel input into the processor 226 (e.g., into the registers 220). In some configurations, the memory manager 214 may load the interleaved multi-channel input into the processor 226 (e.g., into the registers 220) upon being interleaved. In other configurations, the memory manager 214 may first store the interleaved multi-channel input in the memory (e.g., L1 cache) and then may load the multi-channel input into the processor 226 (e.g., into the registers 220).

In some configurations, the interleaver 210 may additionally or alternatively interleave multiple filter channels. For example, the processor 226 may read multiple filter channels from the memory 236. The interleaver 210 may interleave (e.g., arrange and/or order) the multiple filter channels into a sequence for loading into the processor 226 (e.g., SIMD processor). Some or all of the filter coefficients 228 of the multiple filter channels may be loaded into (e.g., stored) in the registers 220. For example, the interleaver 210 may interleave filter coefficients across filter channels.

It should be noted that filters in a DCN convolution layer may be multi-dimensional (e.g., 4-dimensional). For example, a top level may include a number of filters, where each of the filters is a 3-dimensional filter. A 3-dimensional filter may include the number of channels corresponding to the number of channels of input image data and a 2-dimensional filter kernel. The memory manager 214 may store the interleaved multi-channel filter (e.g., the filter coefficients 228) in the registers 220 and/or in a cache (e.g., L1 cache) in the memory 236.

The processor 226 may include and/or implement a convolver 216. The convolver 216 may convolve the interleaved multi-channel image input with a multi-channel filter (e.g., interleaved multi-channel filter). For example, the convolver 216 may multiply and accumulate (MAC) the interleaved multi-channel image input with the multi-channel filter. An example of an implementation for convolving the multi-channel input with the multi-channel filter is given in connection with FIG. 5. In some configurations, the convolution may be a DCN convolution. The memory manager 214 may store the output (e.g., convolution output) in the memory 236. For example, the output may be stored in an L1 data cache.

In some configurations, the memory manager 214 may store a maximum number (e.g., a maximum possible number) of filter coefficients 228 of a filter kernel in registers 220 of the processor 226. In particular, the registers 220 may be limited in size. In some configurations, all of the filter coefficients 228 of a filter kernel may be fit in the registers 220. However, if the filter kernel is too large to be stored in its entirety in the registers 220 and/or if other data (e.g., data that cannot be currently overwritten) occupies the registers 220, only a part of the filter kernel (e.g., a number of filter coefficients 228) may be stored in the registers 220. The remainder of the filter kernel (e.g., the remainder of the filter coefficients) may be stored in a cache (e.g., L1 cache) in the memory 236. Examples of improved caching are given in connection with FIGS. 5 and 7.

In some configurations, the memory manager 214 may apply the maximum number of filter coefficients in convolution operations (by the convolver 216, for example) without reloading any of the maximum number of filter coefficients from memory 236 (e.g., from a cache). In this way, repeated slow accesses of a filter kernel may be avoided, which may improve the efficiency of the convolution operations.

In some configurations, the memory manager 214 may, for each input element (of the input image data), load the element only once for multiple output elements. For example, the processor 226 may perform parallel processing such that each element may be loaded only once for multiple output elements. Examples of parallel processing are given in connection with FIGS. 5 and 8.

In some configurations, the object recognizer 230 may perform object detection and/or recognition based on the convolution. For example, the object recognizer 230 may recognize (e.g., identify) and/or detect a person's face, a person, an animal, an object (e.g., street sign), text, etc., based on the output of the convolution. In some approaches, detecting an object may include detecting a class or category of object. Additionally or alternatively, recognizing an object may include identifying a particular object in the class or category in some approaches. In some configurations, features from the input image may be extracted through the DCN convolution layers. These features may be provided to a classifier to identify a category of the input image (e.g., object). For example, the electronic device 208 (e.g., object recognizer 230) may optionally include a classifier (e.g., a support vector machine (SVM) classifier, a neural network classifier, etc.). The classifier may identify the category of the input image based on the features.

The memory 236 may store instructions and/or data. The processor may access (e.g., read from and/or write to) the memory 236. Examples of instructions and/or data that may be stored by the memory 236 may include image data, bounding region data (e.g., location and/or size of one or more bounding regions), etc.

It should be noted that one or more of the techniques described herein may be implemented. For example, some configurations may implement only one of interleaving (as described in connection with FIG. 6, for example), improved caching (as described in connection with FIG. 7, for example) and parallel processing (as described in connection with FIG. 8, for example). In other configurations, two of interleaving, improved caching and parallel processing may be implemented. In yet other configurations, interleaving, improved caching, and parallel processing may be implemented.

Figure 3:
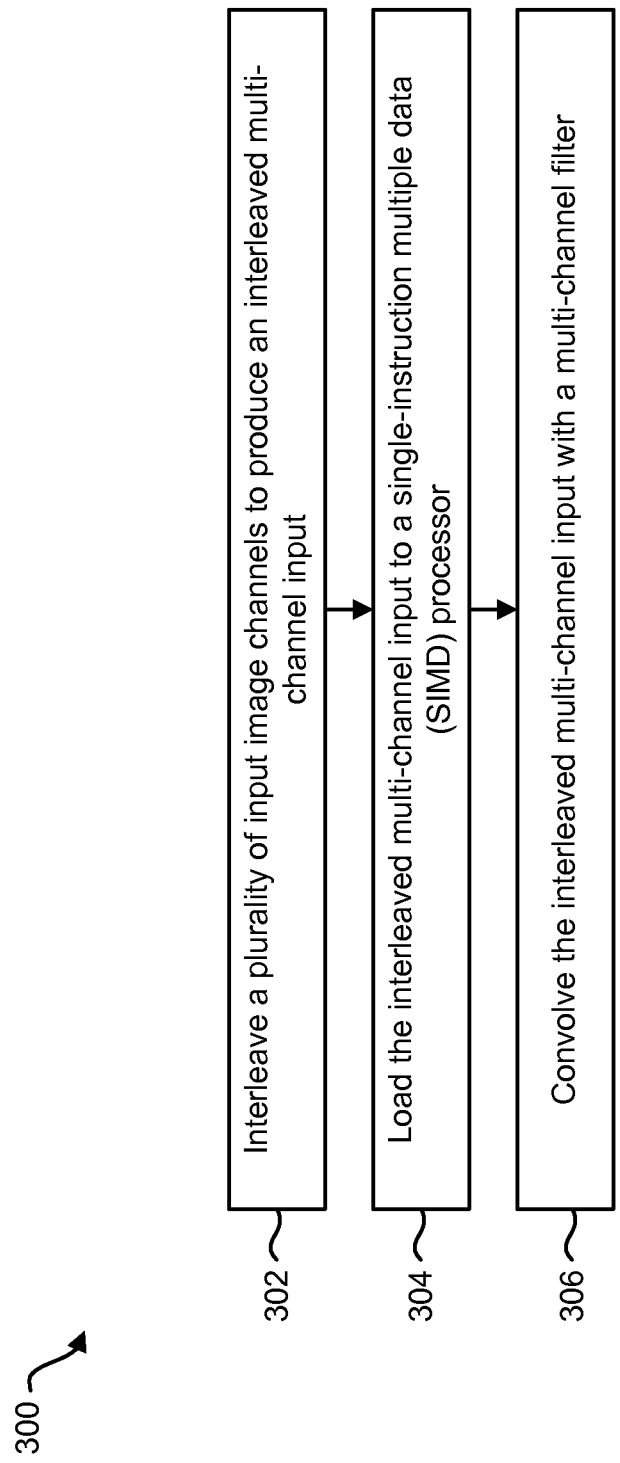
FIG. 3 is a flow diagram illustrating an example of one configuration of a method for image processing.

FIG. 3 is a flow diagram illustrating an example of one configuration of a method 300 for image processing. The method 300 may be performed by the electronic device 208 described in connection with FIG. 2.

The electronic device 208 may interleave 302 a plurality of input image channels 212 to produce an interleaved multi-channel input. This may be accomplished as described in connection with FIG. 2. For example, the electronic device 208 may arrange a plurality of input image channels 212 into an interleaved order. An example of interleaving 302 a plurality of input image channels is given in connection with FIG. 6.

The electronic device 208 may load 304 the interleaved multi-channel input to a single-instruction multiple data (SIMD) processor. This may be accomplished as described in connection with FIG. 2. For example, the electronic device 208 may load the interleaved multi-channel input from the memory 236 (e.g., from an L1 and/or L2 cache) to the processor 226.

The electronic device 208 may convolve 306 the interleaved multi-channel input with a multi-channel filter. This may be accomplished as described in connection with FIG. 2. For example, the electronic device 208 may multiply the interleaved multi-channel input with a multi-channel filter and accumulate over filter dimensions (e.g., filter width and filter height) and over multiple channels. One example of DCN convolution in accordance with the systems and method disclosed herein is given in connection with FIG. 5.

Figure 4:
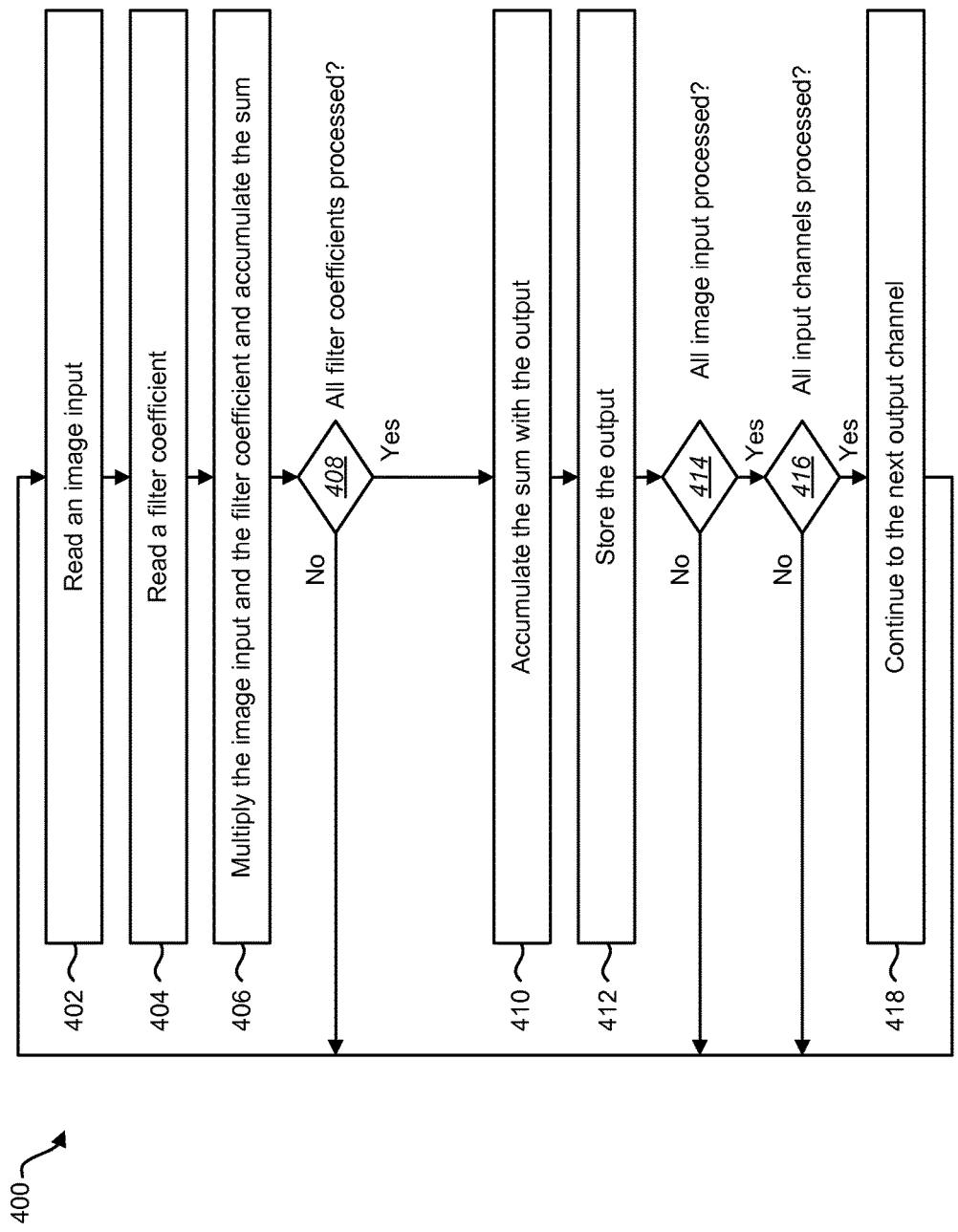
FIG. 4 is a flow diagram illustrating one configuration of a conventional method for implementing DCN convolution.

FIG. 4 is a flow diagram illustrating one configuration of a conventional method 400 for implementing DCN convolution. The method 400 illustrates an inefficient implementation. An electronic device may read 402 an image input. For example, the electronic device may read a pixel element (e.g., one value of one input channel) of an image input from memory.

The electronic device may read 404 a filter coefficient. For example, the electronic device may read a filter coefficient (e.g., one value of one filter channel) of a filter from memory.

The electronic device may multiply 406 the image input and the filter coefficient and accumulate a sum. For example, the electronic device may multiply the image input by the filter coefficient and add the product to any previous product(s) over the width and height dimensions of the filter. One example of pseudocode for multiplying 406 the image input and the filter coefficient and accumulating the sum is: sum+=input*coef, where "coef" denotes a filter coefficient.

The electronic device may determine 408 whether all of the filter coefficients (in a current filter channel, for example) have been processed. For example, the electronic device may determine whether the width and height dimensions (e.g., all coefficients over Wf and Hf) of the filter channel have been processed. If all of the filter coefficients (in a filter channel) have not been processed, the electronic device may return to read 402 the next image input (in an image input channel), to read 404 the next filter coefficient and to multiply and accumulate the sum. This may be repeated until all of the filter coefficients (in the current filter channel) have been processed.

If all of the filter coefficients have been processed, the electronic device may accumulate 410 the sum with any previous corresponding output. For example, the electronic device may read any previous corresponding output from memory and may add the (accumulated) sum to the corresponding output. The electronic device may then store 412 the (accumulated) output. The output may be a single-channel (e.g., 1-channel) output stored in memory. One example of pseudocode for accumulating 410 and storing 412 the sum is: *output+=sum.

The electronic device may determine 414 whether all image input has been processed. For example, the electronic device may determine whether the width and height dimensions (e.g., all values over Wi and Hi) of the image input have been processed. If all of the image input has not been processed, the electronic device may loop the foregoing operations until all of the image input has been processed.

If all of the image input has been processed, the electronic device may determine 416 whether all of the input channels (N) have been processed. If all of the input channels have not been processed, the electronic device may loop the foregoing operations until all of the input channels have been processed.

If all of the input channels have been processed, the electronic device may continue 418 to the next output channel. For example, the electronic device may perform the foregoing operations for the next output channel. The method 400 may be looped until all of the output channels have been processed.

FIG. 5 is a flow diagram illustrating one example of a configuration of a method 500 for implementing DCN convolution in accordance with the systems and methods disclosed herein. One or more of the techniques may be implemented to improve DCN convolution: interleaved data, improved cache efficiency, and/or parallel (e.g., 4-pixel) processing.

An electronic device 208 may read 502 multiple input image channels 212. This may be accomplished as described in connection with FIG. 2. For example, the electronic device 208 may read multiple channels (e.g., 4) of input image data from memory 236. In some configurations, the number of channels read may be equal to the number of data that can be processed by a SIMD processor.

The electronic device 208 may interleave 504 the multiple input image channels 212. This may be accomplished as described in connection with FIG. 2. For example, the electronic device 208 may arrange the multiple input image channels 212 for parallel processing. For instance, corresponding values from a number of input image channels (e.g., 4) may be ordered in a sequence for loading into a SIMD processor.

The electronic device 208 may store 506 the interleaved multi-channel input in a cache (in the memory 236, for instance). For example, the electronic device 208 may store 506 the interleaved multi-channel input in an L1 cache and/or in an L2 cache. In some configurations, the electronic device 208 may store 506 as much of the interleaved multi-channel input in an L1 cache as possible (e.g., all of the multi-channel input, if possible). For example, if all of the interleaved multi-channel input can fit in an L1 cache then all of the interleaved multi-channel input may be stored 506 in the L1 cache. In cases where the L1 cache is not large enough (and/or does not have enough available space) to hold all of the interleaved multi-channel input, the electronic device 208 may store 506 the remainder in the L2 cache.

The electronic device 208 may read 508 multiple filter channels. For example, the electronic device 208 may read filter coefficients of multiple filter channels from memory 236.

The electronic device 208 may interleave 510 the multiple filter channels. This may be accomplished as described in connection with FIG. 2. For example, the electronic device 208 may arrange the multiple filter channels for parallel processing. For instance, corresponding coefficients from a number of filter channels (e.g., 4) may be ordered in a sequence for loading into a SIMD processor. In some configurations, the filter coefficients may be interleaved over channels.

The electronic device 208 may store 512 the interleaved multi-channel filter in register(s) 220 (on the processor 226, for instance) and/or cache (in the memory 236, for instance). For example, the electronic device 208 may store 512 the interleaved multi-channel filter in register(s) 220 and/or in an L1 cache. In some configurations, the electronic device 208 may store 512 as much of the interleaved multi-channel filter in the register(s) 220 as possible (e.g., all of the multi-channel filter, if possible). For example, if all of the interleaved multi-channel filter can fit in the register(s) 220, then all of the interleaved multi-channel filter may be stored 512 in the register(s) 220. In cases where the register(s) 220 are not large enough (and/or do not have enough available space) to store all of the interleaved multi-channel filter, the electronic device 208 may store 512 the remainder in the L1 cache. It should be noted that storing 506 the interleaved multi-channel input in the cache and storing 512 the interleaved multi-channel filter in register(s) and/or cache may improve performance (by improving the cache to provide faster access to the input data and the filter data).

The electronic device 208 may multiply 514 an image input in parallel with multiple filter coefficients and accumulate sums in parallel. For example, the electronic device 208 may multiply 514 an image input value in parallel with multiple filter coefficients and add each product to any previous product(s) over the width and height dimensions of the filter. One example of pseudocode for multiplying 514 the image input in parallel with multiple filter coefficients and accumulating the sums in parallel is: sum0+=input[i]*coef[i]; sum1+=input[i]*coef[i−1]; sum2+=input[i]*coef[i−2]; sum3+=input[i]*coef[i−3]. Since each filter kernel may be quite small in some configurations (e.g., 3 by 3, 5 by 5, etc.), the filter kernel(s) may be stored in processor register(s) 220 and/or in an L1 cache so that the filter coefficient loading time is reduced. The input data may be loaded once, and may be used multiple times with different filter coefficients.

The electronic device 208 may determine 516 whether all of the filter coefficients (in a current filter channel, for example) have been processed. For example, the electronic device 208 may determine whether the multiple width and height dimensions (e.g., all coefficients over (Wf+3) and Hf) of the filter channel have been processed. If all of the filter coefficients (in a filter channel) have not been processed, the electronic device 208 may return to read 508 multiple filter channels and so on. This may be looped until all of the filter coefficients (in the current filter channel) have been processed. It should be noted that each output channel may include the results of the same input image convolved with different filters. Therefore, some operations (e.g., reading 502 multiple input image channels, interleaving 504 the multiple input image channels and/or storing 506 the interleaved multi-channel input in a cache) may only be performed for a first output channel in some configurations. In some configurations, the interleaved multi-channel input may be read from a cache for each of the output channels.

If all of the filter coefficients have been processed, the electronic device 208 may accumulate 518 the sums with any previous corresponding output. For example, the electronic device 208 may read any previous corresponding output from memory 236 and may add the (accumulated) sums to the corresponding output. The electronic device 208 may then store 520 the (accumulated) output in the cache (e.g., L1 cache). The output may be a single-channel (e.g., 1-channel) output stored in memory 236. One example of pseudocode for accumulating 518 and storing 520 the sums is: *output+++=sum0; *output+++=sum1; *output+++=sum2; *output+++=sum3.

The electronic device 208 may determine 522 whether all image input has been processed. For example, the electronic device 208 may determine whether the width and height dimensions (e.g., all values over Wi and Hi) of the image input have been processed. If all of the image input has not been processed, the electronic device 208 may loop one or more of the foregoing operations until all of the image input has been processed.

If all of the image input has been processed, the electronic device 208 may determine 524 whether all of the input channels (N/4) have been processed. If all of the input channels have not been processed, the electronic device 208 may loop one or more of the foregoing operations until all of the input channels have been processed.

If all of the input channels have been processed, the electronic device 208 may continue 526 to the next output channel. For example, the electronic device 208 may perform one or more of the foregoing operations for the next output channel. All or part of the method 500 may be looped until all of the output channels have been processed. FIG. 5 illustrates an example of a combination of three techniques: interleaving, improving cache efficiency, and (multi-pixel (e.g., 4-pixel)) parallel processing. However, it should be noted that one or more of these operations may be implemented depending on the configuration.

FIG. 6 is a diagram illustrating examples of Approach A 660 and Approach B 662 for processing image data. Approach A 660 illustrates an implementation where all N channels are looped. For example, Input A 666a (e.g., input channel n) may be multiplied with Filter A 668a (e.g., filter channel n). The product may be accumulated with Output A 664a. This may be done for all channels.

Approach B 662 illustrates an implementation where interleaving is utilized in accordance with the systems and methods disclosed herein. For example, an interleaved approach may loop N/4 channels. While a number of 4 channels is given as an example, it should be noted that other numbers of channels may be utilized. For instance, the number of channels grouped may be a number that fits in a SIMD register 670. As illustrated in Approach B 662, interleaving the data may exploit the fact that the number of 4 channels for most of layers is a multiple of 4. Furthermore, each multi-channel (e.g., 4-channel) interleaved input may fit in a SIMD register 670. With SIMD instructions, 4-channel convolution may be performed at once. In particular, Input B 666b may be convolved with Filter B 668b. Convolving Input B 666b and Filter B 668b may include multiplying Input B 666b with Filter B 668b and accumulating the product with Output B 664b. This illustrates that the Approach B 662 (e.g., the interleaved approach) may be much more efficient than Approach A 660. It should be noted that the interleaving described in connection with FIG. 6 may be one example of the interleaving described in connection with one or more of FIGS. 2, 3, and 5.

Figure 7:
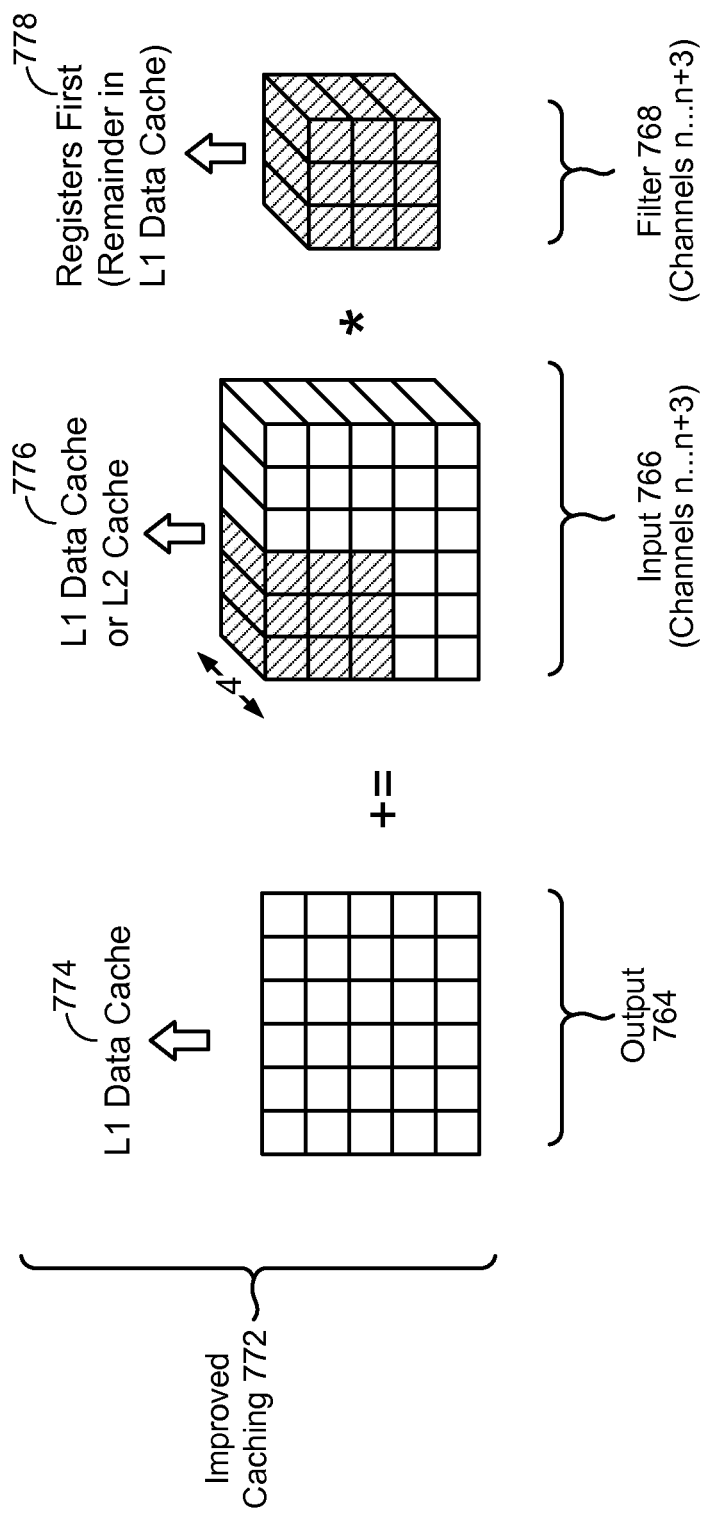
FIG. 7 is a diagram illustrating an example of improved caching.

FIG. 7 is a diagram illustrating an example of improved caching 772. The systems and methods disclosed herein may provide improved cache efficiency. To improve cache efficiency, one or more of the following may be implemented. A filter 768 (e.g., filter kernel) may be loaded to processor registers first 778, with any remainder stored in the L1 data cache 778. For 3×3 filter kernel, for example, filter coefficients may be directly loaded to SIMD registers. For other filter kernel sizes, for example, a partial number of the coefficients may be loaded to SIMD registers, while others may be stored in the L1 data cache.

In some configurations, the improved caching 772 approach may ensure that each channel of output 764 fits in the L1 data cache 774. In some cases, the input data 766 (e.g., 4-channel input data) may or may not completely fit in the L1 data cache. For example, the input 766 may be stored in the L1 data cache and/or the L2 data cache. In some configurations, the improved caching 772 approach may ensure the input 766 fits in the L2 cache (and/or the L1 cache, for example). It should be noted that the caching described in connection with FIG. 7 may be one example of the caching described in connection with one or more of FIGS. 2-3 and 5.

Figure 8:
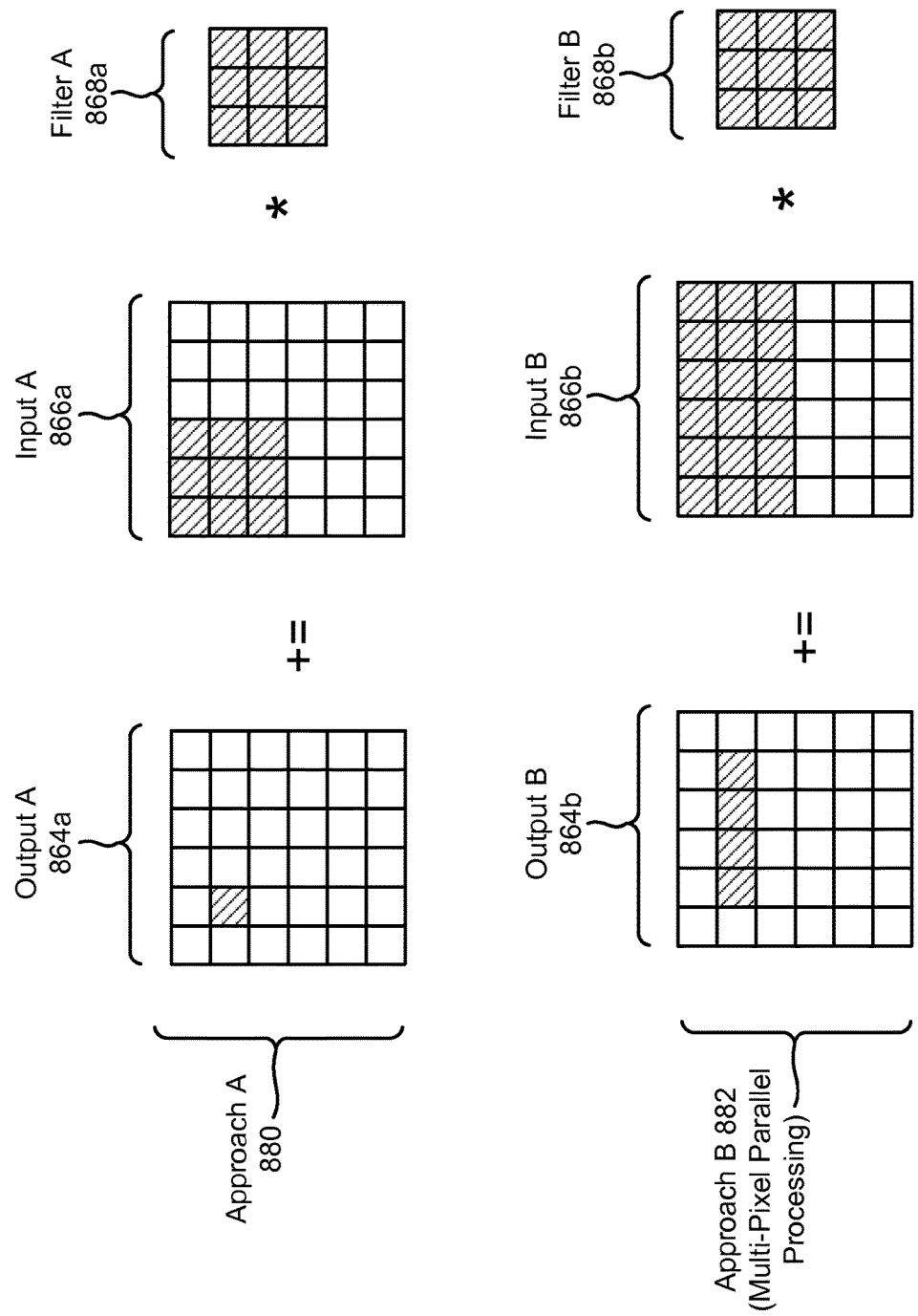
FIG. 8 is a diagram illustrating examples of approaches for processing image data.

FIG. 8 is a diagram illustrating examples of approaches 880, 882 for processing image data. Approach A 880 illustrates an implementation where one input value is processed per instruction. For example, the emphasized portion of Input A 866a and Filter A 868a may be processed for one input value. For example, for each input[i], output[i]+=input[i]*coef[i].

Approach B 882 illustrates an implementation where multi-pixel (e.g., 4-pixel) parallel processing is utilized in accordance with the systems and methods disclosed herein. For example, the systems and methods disclosed herein may provide a greater chance of parallel processing inside the convolution loop for a multi-issue (e.g., dual-issue) CPU. This may save instructions to load data and filter coefficients. For instance, Approach A 880 and Approach B 882 illustrate examples with 3×3 filters (Filter A 868a and Filter B 868b). In Approach A 880, 18 loading instructions may be utilized per output (9 for input data and 9 for filter coefficients). In Approach B 882, with 4-pixel parallel processing, each input (of Input B 866b) may contribute to up to 4 outputs (of Output B 864b). For example, each time an input pixel is loaded, its contribution may be added into 3 of 4 output pixels. For instance, (18+9)/4=6.75 loading instructions per output or 18/4=4.5 loading instructions per output if all filter coefficients can fit in the registers. In Approach B 882, for each input[i]: output0[i]+=input[i]*coef[i]; output1[i]+=input[i]*coef[i−1]; output2[i]+=input[i]*coef[i−2]. Depending on filter dimensions, some inputs may not contribute to all three outputs, for example. It should be noted that for a 3×3 filter, four pixels may be processed in parallel and one input may contribute to three outputs. For a filter kernel larger than 3×3, for example, one input may contribute to four outputs.

It should be noted that the parallel processing described in connection with FIG. 8 may be one example of the parallel processing described in connection with one or more of FIGS. 2-3 and 5.

Implementations of the systems and methods disclosed herein were tested. Some measurement results comparing processing for a 227×227 input image are given as follows. In particular, the measurements were taken on a tablet for a 227×227 input image. The convolution time with a plain C implementation took 1,307 ms, while the convolution time with the improved convolution implementation took 181 ms. This represents a gain of approximately 7.2×. For example, the improved implementation makes image recognition approximately 7 times faster.

Figure 9:
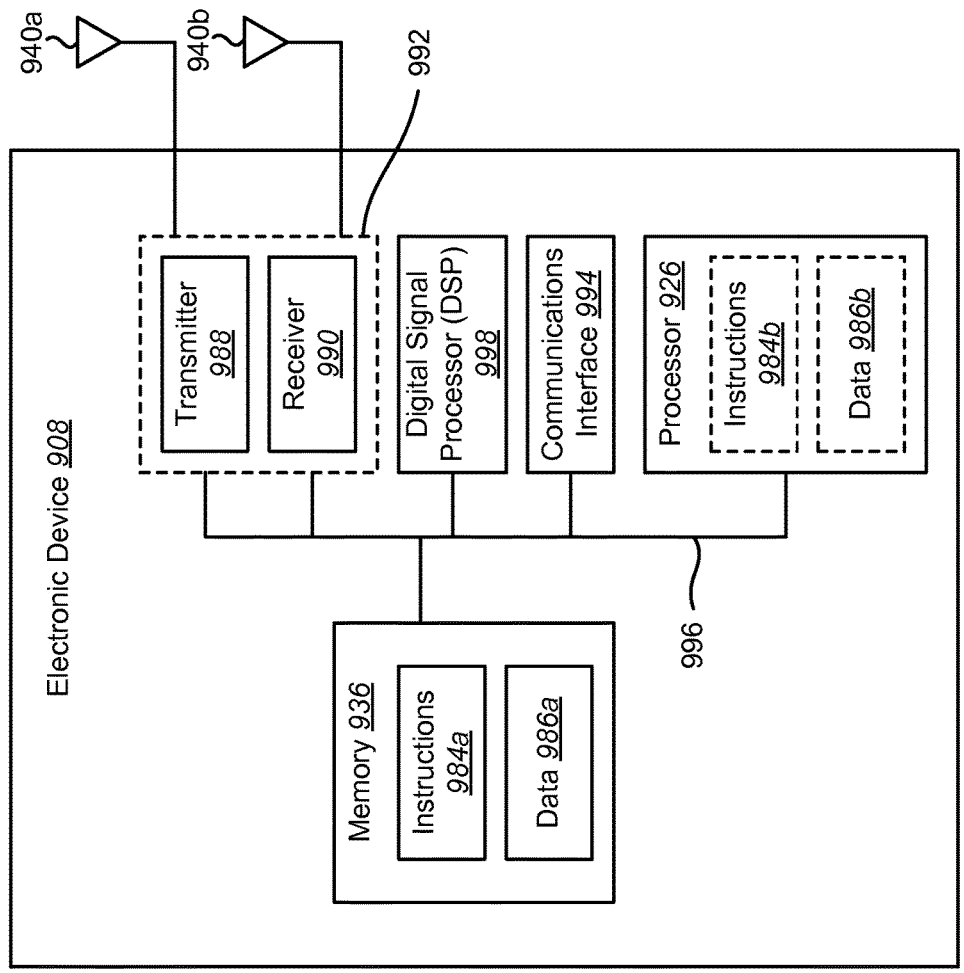
FIG. 9 illustrates certain components that may be included within an electronic device configured to implement various configurations of the systems and methods disclosed herein.

FIG. 9 illustrates certain components that may be included within an electronic device 908 configured to implement various configurations of the systems and methods disclosed herein. The electronic device 908 may be, for example, a wireless device (e.g., wireless communication device), an access terminal, a mobile station, a user equipment (UE), a smartphone, a digital camera, a video camera, a tablet device, a laptop computer, an automobile, a robot, an aircraft, a UAV, etc. The electronic device 908 may be implemented in accordance with the electronic device 208 described herein. The electronic device 908 includes a processor 926. The processor 926 may be a general purpose single- or multi-chip microprocessor (e.g., an ARM), a special purpose microprocessor (e.g., a digital signal processor (DSP)), a microcontroller, a programmable gate array, etc. The processor 926 may be referred to as a central processing unit (CPU). Although just a single processor 926 is shown in the electronic device 908, in an alternative configuration, a combination of processors (e.g., an ARM and DSP) could be used.

The electronic device 908 also includes memory 936. The memory 936 may be any electronic component capable of storing electronic information. The memory 936 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 986a and instructions 984a may be stored in the memory 936. The instructions 984a may be executable by the processor 926 to implement one or more of the methods described herein. Executing the instructions 984a may involve the use of the data that is stored in the memory 936. When the processor 926 executes the instructions 984, various portions of the instructions 984b may be loaded onto the processor 926, and various pieces of data 986b may be loaded onto the processor 926.

The electronic device 908 may also include a transmitter 988 and a receiver 990 to allow transmission and reception of signals to and from the electronic device 908. The transmitter 988 and receiver 990 may be collectively referred to as a transceiver 992. Multiple antennas 940a-b may be electrically coupled to the transceiver 992. The electronic device 908 may also include (not shown) multiple transmitters, multiple receivers, multiple transceivers and/or additional antennas.

The electronic device 908 may include a digital signal processor (DSP) 998. The electronic device 908 may also include a communications interface 994. The communications interface 994 may enable one or more kinds of input and/or output. For example, the communications interface 994 may include one or more ports and/or communication devices for linking other devices to the electronic device 908. Additionally or alternatively, the communications interface 994 may include one or more other interfaces (e.g., touchscreen, keypad, keyboard, microphone, camera, etc.). For example, the communications interface 994 may enable a user to interact with the electronic device 908.

The various components of the electronic device 908 may be coupled together by one or more buses, which may include a power bus, a control signal bus, a status signal bus, a data bus, etc. For the sake of clarity, the various buses are illustrated in FIG. 9 as a bus system 996.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method performed by an electronic device, comprising:
   interleaving a plurality of input image channels to produce an interleaved multi-channel input;
   loading the interleaved multi-channel input to a single-instruction multiple data (SIMD) processor;
   interleaving multiple filter channels to produce a multi-channel filter; and
   convolving the interleaved multi-channel input with the multi-channel filter.

2. The method of claim 1, further comprising performing object recognition based on the convolution.

3. The method of claim 1, further comprising:
   storing a maximum number of filter coefficients of a filter kernel in registers of the SIMD processor; and
   applying the maximum number of filter coefficients in convolution operations without reloading any of the maximum number of filter coefficients from a cache.

4. The method of claim 1, further comprising, for each input element, loading the element only once for multiple output elements.

5. The method of claim 1, wherein convolving the interleaved multi-channel input with the multi-channel filter comprises multiplying an image input in parallel with multiple filter coefficients and accumulating sums in parallel.

6. The method of claim 1, wherein the convolution is Deep Convolution Network (DCN) convolution.

7. The method of claim 1, further comprising storing a kernel of the multi-channel filter in registers.

8. The method of claim 1, further comprising storing the interleaved multi-channel input in at least one of a level 1 (L1) cache and a level 2 (L2) cache.

9. The method of claim 1, further comprising storing an output in a level 1 (L1) cache.

10. An electronic device, comprising:
    a single-instruction multiple data (SIMD) processor configured
    to interleave a plurality of input image channels to produce an interleaved multi-channel input,
    to load the interleaved multi-channel input to the SIMD processor,
    to interleave multiple filter channels to produce a multi-channel filter, and
    to convolve the interleaved multi-channel input with the multi-channel filter.

11. The electronic device of claim 10, wherein the SIMD processor is configured to perform object recognition based on the convolution.

12. The electronic device of claim 10, wherein the SIMD processor is configured to:
    store a maximum number of filter coefficients of a filter kernel in registers of the SIMD processor; and
    apply the maximum number of filter coefficients in convolution operations without reloading any of the maximum number of filter coefficients from a cache.

13. The electronic device of claim 10, wherein the SIMD processor is configured to, for each input element, load the element only once for multiple output elements.

14. The electronic device of claim 10, wherein the SIMD processor is configured to multiply an image input in parallel with multiple filter coefficients and to accumulate sums in parallel.

15. The electronic device of claim 10, wherein the SIMD processor is configured to perform Deep Convolution Network (DCN) convolution.

16. The electronic device of claim 10, wherein the SIMD processor is configured to store a kernel of the multi-channel filter in registers.

17. The electronic device of claim 10, further comprising a memory, wherein the memory is configured to store the interleaved multi-channel input in at least one of a level 1 (L1) cache and a level 2 (L2) cache.

18. The electronic device of claim 10, further comprising a memory, wherein the memory is configured to store an output in a level 1 (L1) cache.

19. An apparatus, comprising:
    means for interleaving a plurality of input image channels to produce an interleaved multi-channel input;
    means for loading the interleaved multi-channel input to a parallel processing means;
    means for interleaving multiple filter channels to produce a multi-channel filter; and means for convolving the interleaved multi-channel input with the multi-channel filter.

20. The apparatus of claim 19, further comprising:
means for storing a maximum number of filter coefficients of a filter kernel in registers of the parallel processing means; and
means for applying the maximum number of filter coefficients in convolution operations without reloading any of the maximum number of filter coefficients from a cache.

21. The apparatus of claim 19, further comprising means for, for each input element, loading the element only once for multiple output elements.

22. The apparatus of claim 19, wherein the means for convolving comprises means for performing Deep Convolution Network (DCN) convolution.

23. A computer-program product, comprising a non-transitory computer-readable medium having instructions thereon, the instructions comprising:
code for causing an electronic device to interleave a plurality of input image channels to produce an interleaved multi-channel input;
code for causing the electronic device to load the interleaved multi-channel input to a single-instruction multiple data (SIMD) processor;
code for causing the electronic device to interleave multiple filter channels to produce a multi-channel filter; and
code for causing the electronic device to convolve the interleaved multi-channel input with a multi-channel filter.

24. The computer-program product of claim 23, further comprising:
code for causing the electronic device to store a maximum number of filter coefficients of a filter kernel in registers of the SIMD processor; and
code for causing the electronic device to apply the maximum number of filter coefficients in convolution operations without reloading any of the maximum number of filter coefficients from a cache.

25. The computer-program product of claim 23, further comprising code for causing the electronic device to, for each input element, load the element only once for multiple output elements.

26. The computer-program product of claim 23, wherein the code for causing the electronic device to convolve comprises code for causing the electronic device to perform Deep Convolution Network (DCN) convolution.

* * * * *